United States Patent [19]

Leighty et al.

[11] 4,025,108

[45] May 24, 1977

[54] SEAT SUPPORT PROP

[75] Inventors: Conard E. Leighty, Metamora; Kennith E. Vaughn, Creve Coeur, both of Ill.

[73] Assignee: Caterpillar Tractor Co., Peoria, Ill.

[22] Filed: June 10, 1976

[21] Appl. No.: 694,629

[52] U.S. Cl. .............................. 297/335; 297/344
[51] Int. Cl.² .......................................... B60N 1/02
[58] Field of Search .......... 297/331, 334, 335, 311; 5/167, 133, 136, 47, 37; 248/371; 108/134

[56] References Cited

UNITED STATES PATENTS

| 2,028,426 | 1/1936 | Wunderlich | 5/47 |
| 2,031,287 | 2/1936 | Swanson | 108/134 |
| 2,298,450 | 10/1942 | Baker | 297/334 X |
| 2,395,424 | 2/1946 | O'Neil | 5/47 |
| 2,558,928 | 7/1951 | Bryan | 297/311 |

Primary Examiner—Francis K. Zugel

Attorney, Agent, or Firm—Wegner, Stellman, McCord, Wiles & Wood

[57] ABSTRACT

A seat support prop for use with a retractable seat assembly. The prop is arranged to support the seat in a retracted position such as for providing access to the space normally below the seat. The prop includes a latch pin received in a guide slot of a mounting element of the retractable seat assembly. The slot includes an intermediate transfer portion obliquely related to a guide portion thereof in which the pin is received when the seat is in the seating position. The slot is generally U-shaped with the transfer portion defining the bight thereof and extending at a substantial angle to the horizontal when the seat is in the seating position. The guide portion extends at a small angle to the horizontal when the seat is in the seating position. The latching portion extends generally perpendicular to the transfer portion. The prop structure requires that the seat assembly be moved beyond the retracted position both to effect the latching thereof and the release thereof in the selective positioning of the seat assembly.

10 Claims, 2 Drawing Figures

SEAT SUPPORT PROP

BACKGROUND OF THE INVENTION

1. Field of the Invention

This invention relates to seat assemblies and in particular to retractable seat assemblies having means for releasably latching the seat thereof in a retracted elevated position.

2. Description of the Prior Art

To provide access to components such as batteries and the like which are conventionally stored in vehicles subjacent the driver's seat, seat assemblies are provided which are retractable to an elevated retracted position permitting access to the normally subjacent components. It is desirable in such seat assembly structures to provide some prop means for holding the seat in the retracted position and it is important that the prop means effectively positively retain the seat so as to avoid injury to personnel and/or damage to equipment should the seat undesirably become unlatched and fall back to the normal seating position. A number of different seat-latching devices have been developed for use in such applications. However, the known latching devices have the disadvantages of relatively high complexity, high cost, and impositive latching.

SUMMARY OF THE INVENTION

The present invention comprehends an improved retractable seat assembly having a seat support prop which effectively positively retains the seat in the retracted position while yet permits ready repositioning of the seat between the seating and retracted positions as desired.

In the illustrated embodiment, the seat assembly includes a mounting element defining a slot in which a latch pin is slidably received to control the positioning of the seat. The slot includes a guide portion, a latch portion, and a transfer portion. The pin may be carried on the distal end of an arm which is pivotally mounted to the vehicle or other adjacent support suitable to maintain the seat in the retracted position through the connection thereof by means of the arm and latch pin.

The slot is generally U-shaped with the guide portion extending at a small angle to the horizontal downwardly and forwardly when the seat is in the seating position. The transfer portion extends obliquely from one end of the guide portion and at a substantial angle to the horizontal when the seat is in the seating position. The latching portion extends forwardly and upwardly from the distal end of the transfer portion, and in the illustrated embodiment, extends substantially perpendicular thereto.

The latch portion of the slot is substantially shorter than the guide portion.

The link arm carrying the latch pin is swingable so as to permit a substantial reciprocating movement of the latch pin in the guide portion of the slot prior to the movement of the latch pin into the transfer portion.

The latch pin is moved into the latch portion of the slot as an incident of movement of the seat beyond the retracted position to a maximum swung position and return of the seat to the retracted position.

Return of the seat from the retracted position to the seating position is effected by firstly moving the seat back to the maximum swung position from the retracted position and then moving the latch pin through the transfer portion of the slot back to the guide portion.

Thus, the present invention comprehends an improved latching means effectively requiring a positive intended movement of the seat to disengage the latch pin from the latch portion of the slot, thereby effectively positively preventing inadvertent or accidental return of the seat from the retracted position to the seating position.

The support prop of the retractable seat assembly of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
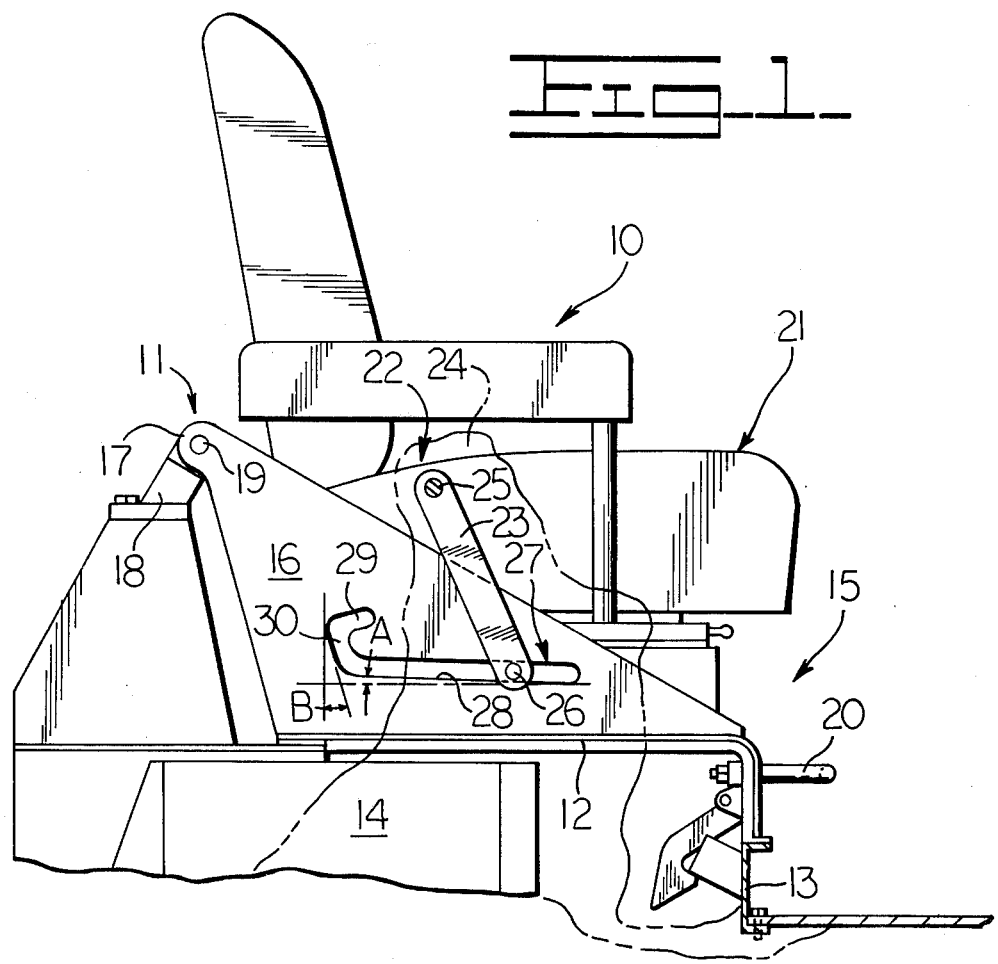
FIG. 1 is a fragmentary side elevation of a retractable seat assembly embodying the invention installed in a vehicle.

In the exemplary embodiment of the invention as disclosed in the drawing, a retractable seat assembly generally designated 10 includes a mounting element generally designated 11 having a base portion 12 carried on a support 13 to overlie a component space 14 of a vehicle generally designated 15.

The mounting element further includes a side plate 16 having a connecting portion 17 pivotally mounted to a support 18 by a pivot pin 19.

The base may be provided with a handle 20 for use in swinging the seat assembly from the seating position of FIG. 1 to a raised, retracted position such as to provide access to the component space 14.

As shown in FIG. 1, the seat assembly includes a seat 21 carried by the mounting element 11. The mounting element side plate 16 is disposed at one side of the seat.

As indicated briefly above, the seat is selectively retained in a retracted position by an improved support prop means 22. More specifically, the support prop means includes a link arm 23 having one end pivotally connected to a support portion 24 of the vehicle by a pivot pin 25. The other end of the link arm 23 is provided with a latch pin 26 which is slidably received in a slot generally designated 27 in the side plate 16.

As best seen in FIG. 1, the slot 27 is generally U-shaped having a lower, substantially rectilinear guide leg portion 28, an upper latch portion 29, and an interconnecting transfer portion 30.

As shown in FIG. 1, the transfer portion 30 extends obliquely to the guide portion 28 and the latch portion 29 extends generally perpendicularly to the transfer portion 30. The guide portion 28 may extend at a small angle A to the horizontal in a forwardly, downwardly direction. The transfer portion 30 may extend at a substantial angle B to the horizontal in a rearwardly, upwardly direction. The connections between the slot portions may be rounded to facilitate movement of the latch pin 26 therebetween.

To effect a latched disposition of the seat assembly in the retracted position, the user firstly raises the seat by means of handle 20. Additional swinging movement of the seat assembly about the pivot 19 causes the latch pin 26 to move rearwardly through the slot guide portion 28 as the slot moves in a counterclockwise direction about the axis of pivot 19. Concurrently the link arm 23 is swung in a counterclockwise direction upwardly until latch pin 26 reaches the end of slot guide portion 28 adjacent portion 30 whereupon further swinging of the seat assembly causes the ramplike transfer portion 30 to urge the latch pin 26 forcibly therethrough to the end of the transfer slot portion adjacent the latch portion 29, as shown in full lines in FIG. 2. In this position, the seat 21 is in a maximum swung position.

The seat assembly is then latched in a retracted position of the seat by permitting the seat assembly to swing back in a clockwise direction a small amount until pin 26 is received in the upper end of the latch portion 29 of the slot 27. Thus, the retracted position of the seat is slightly clockwise from the full line position of FIG. 2 and is effectively positively maintained by the positive reception of the latch pin 26 in the upper end of the now vertically extending latch portion 29 of the guide slot.

Figure 2:
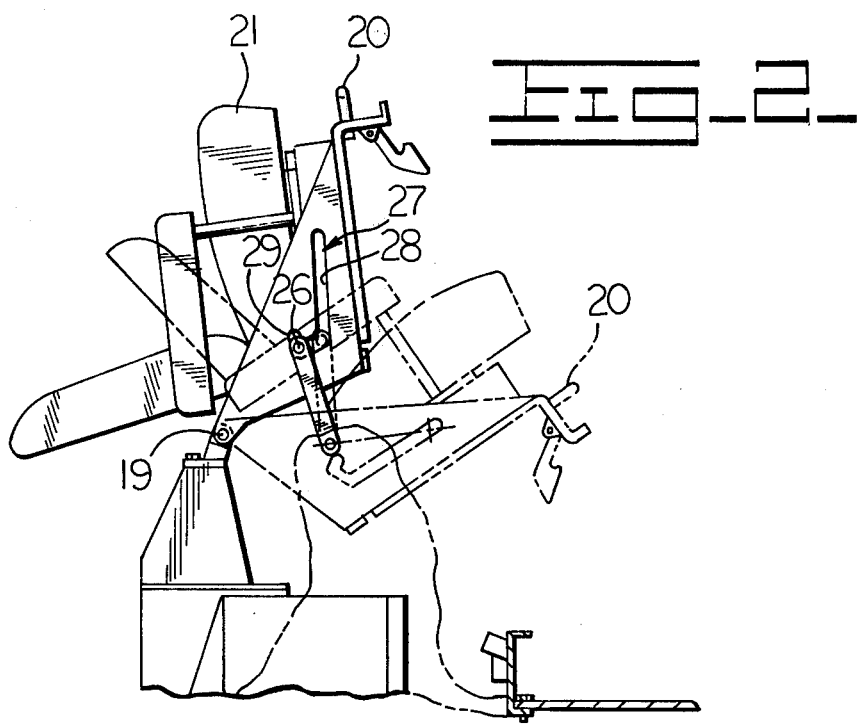
FIG. 2 is a reduced fragmentary side elevation illustrating in phantom lines an intermediate position of the seat assembly, and in full lines a fully swung position of the seat assembly.

To effect a movement of the seat assembly back to the seating position of FIG. 1, the user must first raise the seat assembly, i.e, move the seat assembly in a counterclockwise direction to the fully swung position shown in full lines in FIG. 2, whereupon the latch pin 26 is again disposed in the end of transfer portion 30 of the guide slot 27, now permitting the latch pin to move along the transfer portion 30 back to the guide portion 28 of the slot and then along the slot portion 28 to the normal position wherein the seat 21 is in the seating position, as shown in FIG. 1.

As seen in FIG. 2, the seat assembly is effectively positively supported on the pins 19 and 26 in the retracted position effectively precluding inadvertent return of the seat assembly to the seating position of FIG. 1 in the absence of the positive unlatching swinging of the seat assembly to the fully swung position as by an intentional further movement of the seat assembly in a clockwise direction.

In the illustrated embodiment, the link arm 23 must be manually urged along slot portion 30 from the end of slot portion 29 to the end of slot portion 28 when the seat assembly is swung to the fully swung position of FIG. 2. Thus, the prop means of the present invention provides a further positive prevention of undesirable return of the seat assembly to the seating position.

As indicated briefly above, the length of slot portion 29 is relatively small. Similarly, the length of slot portion 30 is relatively small. Thus, the movement of the latch pin 26 to effect the desired latching of the seat assembly in the retracted position may be effected by a relatively small controlled movement of the seat assembly.

The angularity of the transfer slot portion 30 is preselected to effect a forceful urging of the latch pin to the end of the latch slot portion 29 as a result of the swinging of the seat assembly. Thus, the latching operation is further facilitated by the effectively automatic positioning of the latching means as a function of the swinging of the seat assembly itself.

As seen in FIG. 1, the pivot axes of pins 19 and 25 are displaced so that a reciprocating movement of the latch pin 26 in the guide slot 28 occurs during the swinging movement of the seat assembly. The length of the guide portion 28 is preselected to permit this reciprocating movement while effectively guiding the latch pin to the transfer portion when the seat assembly is brought to adjacent the retracted position.

The foregoing disclosure of specific embodiments is illustrative of the broad inventive concepts comprehended by the invention.

What is claimed is:

1. In a retractable seat assembly mounted to a fixed support, said assembly having a seat having a mounting element, pivot means for pivotally mounting the mounting element to said support for swinging the seat thereon between a lower seating position and an upper retracted position, improved means for latching the mounting element and seat releasably in the retracted position comprising: a latch pin; means mounting the latch pin to the support including a link arm having opposite ends, said latch pin being mounted to one end, and pivot means for pivotally mounting the other end of said arm to said support; means movable with the seat defining a U-shaped slot slidably receiving said latch pin, the legs of said slot defining a lower guide portion and an elongated upper latch portion, and a transfer portion extending between said latch and guide portions, said latch portion extending generally perpendicular to said transfer portion, said pin being disposed in said guide portion when said seat is in the seating position and being brought to said transfer portion as an incident of said seat being moved to said retracted position from said seating position, said pin being moved through said transfer portion and into said latch portion as an incident of further movement of the seat rearwardly beyond said retracted position to a maximum swung position and return of the seat to the retracted position, said pin being movable from said latch portion as an incident of return of the seat to the maximum swung position and urging of the pin through the slot transfer portion to said guide portion with the seat being retained adjacent said maximum swung position whereupon lowering of the seat to the seating position may effect movement of the pin through the slot guide portion.

2. The retractable seat assembly of claim 1 wherein said mounting element of the seat includes a side plate, said slot being provided in said side plate.

3. The retractable seat assembly of claim 1 wherein said transfer portion defines a generally rectilinear bight extending at an obtuse angle to said guide portion.

4. The retractable seat assembly of claim 1 wherein said guide portion is generally rectilinear and extends forwardly and downwardly at a small angle to the horizontal when the seat is in the seating position.

5. The retractable seat assembly of claim 1 wherein said transfer portion is generally rectilinear and extends forwardly and downwardly at a large angle to the horizontal when the seat is in the seating position.

6. The retractable seat assembly of claim 1 wherein said latching portion is generally rectilinear and extends rearwardly and downwardly at a small angle to the horizontal when the seat is in the seating position.

7. The retractable seat assembly of claim 1 wherein said means for mounting the latch pin comprises a link arm pivotally mounted to the support.

8. In a retractable seat assembly mounted to a fixed support, said assembly having a seat having a mounting element, pivot means for pivotally mounting the mounting element to said support for swinging the seat thereon between a lower seating position and an upper retracted position, improved means for latching the mounting element and seat releasably in the retracted position comprising:
- a latch pin;
- means mounting the latch pin to the support including a link arm having opposite ends, said latch pin being mounted to one end, and pivot means for pivotally mounting the other end of said arm to said support; and
- means movable with the seat defining a U-shaped slot slidably receiving said latch pin, the legs of said slot defining a lower guide portion and an elongated upper latch portion, and a transfer portion extending between said latch and guide portions, said latch portion extending generally perpendicular to said transfer portion, said pin being disposed in said guide portion when said seat is in the seating position and being brought to said transfer portion as an incident of said seat being moved to said retracted position, said pin being moved through said transfer portion and into said latch portion as an incident of further movement of the seat rearwardly beyond said retracted position to a maximum swung position and return of the seat to the retracted position, said pin being movable from said latch portion as an incident of return of the seat to the maximum swung position and urging of the pin through the slot transfer portion to said guide portion with the seat being retained adjacent said maximum swung position whereupon lowering of the seat to the seating position may effect movement of the pin through the slot guide portion, said guide portion being generally rectilinear and extending forwardly and downwardly at a small angle to the horizontal when the seat is in the seating position, said transfer portion being generally rectilinear and extending forwardly and downwardly at a large angle to the horizontal when the seat is in the seating position, and said latching portion being generally rectilinear and extending rearwardly and downwardly at a small angle to the horizontal when the seat is in the seating position.

9. The retractable seat assembly of claim 8 wherein said latch portion is substantially shorter than said guide portion.

10. The retractable seat assembly of claim 8 wherein said latch portion extends substantially vertically and said pin is disposed in the upper end thereof when the seat is in said retracted position.

* * * * *